(12) United States Patent
Sako et al.

(10) Patent No.: US 10,133,481 B2
(45) Date of Patent: Nov. 20, 2018

(54) DISPLAY CONTROL APPARATUS AND METHOD FOR ESTIMATING ATTRIBUTE OF A USER BASED ON THE SPEED OF AN INPUT GESTURE

(71) Applicants: Yoichiro Sako, Tokyo (JP); Mitsuru Takehara, Tokyo (JP); Kazuyuki Sakoda, Chiba (JP); Kazuhiro Watanabe, Tokyo (JP); Takatoshi Nakamura, Tokyo (JP); Kohei Asada, Kanagawa (JP); Kazunori Hayashi, Tokyo (JP); Yasunori Kamada, Kanagawa (JP); Takayasu Kon, Tokyo (JP); Akira Tange, Tokyo (JP); Hiroyuki Hanaya, Kanagawa (JP); Tomoya Onuma, Shizuoka (JP); Yuki Koga, Tokyo (JP)

(72) Inventors: Yoichiro Sako, Tokyo (JP); Mitsuru Takehara, Tokyo (JP); Kazuyuki Sakoda, Chiba (JP); Kazuhiro Watanabe, Tokyo (JP); Takatoshi Nakamura, Tokyo (JP); Kohei Asada, Kanagawa (JP); Kazunori Hayashi, Tokyo (JP); Yasunori Kamada, Kanagawa (JP); Takayasu Kon, Tokyo (JP); Akira Tange, Tokyo (JP); Hiroyuki Hanaya, Kanagawa (JP); Tomoya Onuma, Shizuoka (JP); Yuki Koga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 310 days.

(21) Appl. No.: 15/066,887

(22) Filed: Mar. 10, 2016

(65) Prior Publication Data

US 2016/0196061 A1    Jul. 7, 2016

Related U.S. Application Data

(63) Continuation of application No. 14/139,073, filed on Dec. 23, 2013, now Pat. No. 9,317,737.

(30) Foreign Application Priority Data

Jan. 15, 2013    (JP) .................................. 2013-004578

(51) Int. Cl.
*G06F 3/0488*    (2013.01)
*G06F 3/16*    (2006.01)
(Continued)

(52) U.S. Cl.
CPC .......... *G06F 3/04886* (2013.01); *G06F 3/005* (2013.01); *G06F 3/017* (2013.01);
(Continued)

(58) Field of Classification Search
CPC ................ G06F 3/017; G06K 9/00335; G06K 2009/00322
See application file for complete search history.

(56) References Cited

U.S. PATENT DOCUMENTS 5,627,567 A    5/1997    Davidson
5,818,451 A    10/1998    Bertram et al.
(Continued)

FOREIGN PATENT DOCUMENTS

CN    17-53078 A    3/2006
CN    10-2741795 A    10/2012
WO    2012-144666 A    10/2012

OTHER PUBLICATIONS

Office Action for CN Patent Application No. 201410008283.4, dated Oct. 26, 2016, 09 pages of Office Action and 11 pages of English Translation.

*Primary Examiner* — Larry Lee
(74) *Attorney, Agent, or Firm* — Chip Law Group

(57) ABSTRACT

A display control apparatus comprising circuitry configured to obtain information of an input speed of a gesture input of at least one user from a sensor configured to detect a hand of the user, estimate an attribute of the user based on the input speed, control a display apparatus to display a layout image for the gesture input based on the estimated attribute of the user.

20 Claims, 9 Drawing Sheets

(51) Int. Cl.
    *G06F 3/00*          (2006.01)
    *G06F 3/01*          (2006.01)
    *G06K 9/00*         (2006.01)

(52) U.S. Cl.
    CPC ......... *G06F 3/167* (2013.01); *G06K 9/00288* (2013.01); *G06K 9/00335* (2013.01); *G06K 9/00375* (2013.01); *G06K 2009/00322* (2013.01)

(56) References Cited

U.S. PATENT DOCUMENTS

| | | | |
|---|---|---|---|
| 8,498,491 | B1 | 7/2013 | Steffens |
| 2007/0098235 | A1 | 5/2007 | Halavee |
| 2007/0296848 | A1 | 12/2007 | Terashima |
| 2009/0060384 | A1 | 3/2009 | Hayaishi |
| 2010/0165382 | A1* | 7/2010 | Asano ................ G06K 9/00228 358/1.15 |
| 2011/0057875 | A1* | 3/2011 | Shigeta ................ G06F 3/011 345/156 |
| 2011/0179374 | A1 | 7/2011 | Yagi et al. |
| 2011/0235915 | A1 | 9/2011 | Yamaguchi |
| 2011/0237324 | A1 | 9/2011 | Clavin |
| 2011/0267278 | A1 | 11/2011 | Wickstrom |
| 2012/0113135 | A1 | 5/2012 | Sakai |
| 2012/0163723 | A1 | 6/2012 | Balan et al. |
| 2013/0019191 | A1* | 1/2013 | Arnold ................ G06F 3/04886 715/765 |
| 2013/0058503 | A1 | 3/2013 | Kato et al. |
| 2013/0283263 | A1 | 10/2013 | Elemary |
| 2014/0099029 | A1 | 4/2014 | Savvides et al. |
| 2014/0168083 | A1 | 6/2014 | Ellard |

\* cited by examiner

FIG. 1
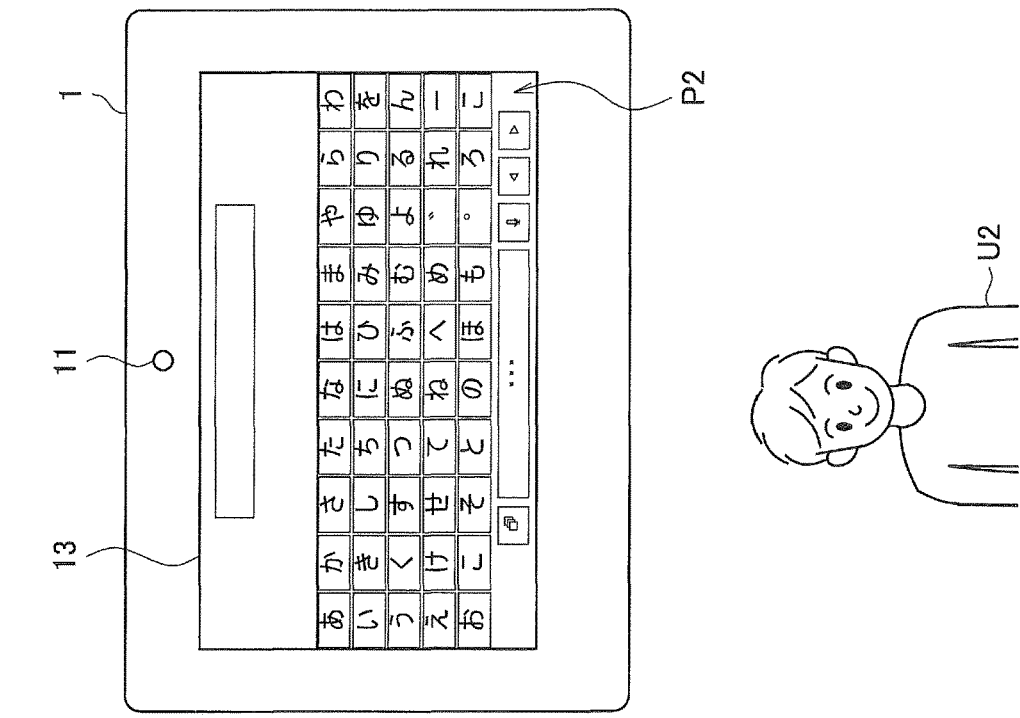
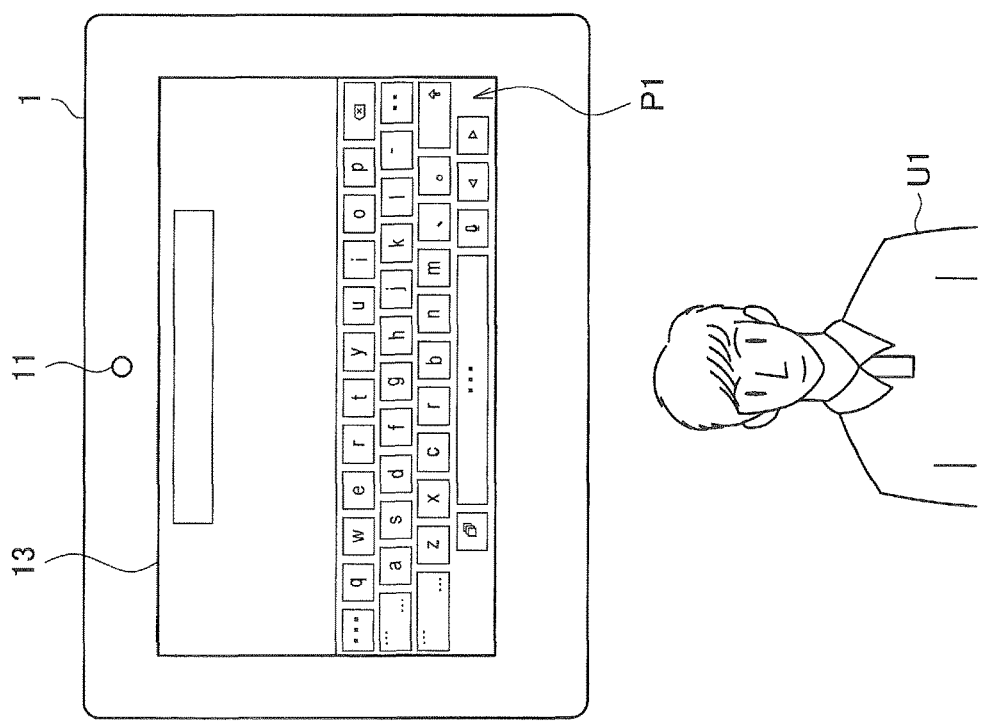

DISPLAY CONTROL APPARATUS AND METHOD FOR ESTIMATING ATTRIBUTE OF A USER BASED ON THE SPEED OF AN INPUT GESTURE

CROSS REFERENCE TO RELATED APPLICATIONS

This application claims the benefit of Japanese Priority Patent Application JP 2013-004578 filed Jan. 15, 2013, the entire contents of which are incorporated herein by reference.

BACKGROUND

The present disclosure relates to an input apparatus, an output apparatus, and a storage medium.

Regarding control of an information processing apparatus according to a user environment, for example, JP 2009-536415T discloses a system and method for managing, route setting, and controlling connections among apparatuses arranged within the environment in order to express a specific desired state.

Further, in recent years, information processing apparatuses having various characteristics have been developed. For example, a utilization method has been proposed that utilizes the characteristics of a plurality of apparatuses, such as a laptop PC (personal computer) and a tablet PC, by connecting the apparatuses to each other and enabling one of the apparatuses to be controlled by another of the apparatuses. For example, specifically, JP 2012-108658A discloses a computer system that displays the same image on a plurality of computers by simultaneously processing the same content on the plurality of computers.

In addition, regarding control of an output device such as a printer or a video camera, JP 2002-281277A discloses a network system capable of increasing security by limiting output of the output device using data about a physical characteristic (e.g., fingerprint data).

SUMMARY

However, in the above patent documents, there is no mention of setting an input mode or an output mode of an information processing apparatus based on a user attribute.

Moreover, when utilizing an information processing apparatus, although it is possible to control so that an information processing apparatus is in an environment that is optimized for an individual user by inputting a user name and a password to log in, such a log-in process requires user pre-registration. Further, if the user cannot remember his/her user name and password, the user cannot log in. Therefore, if the input mode and the output mode of the information processing apparatus can be somewhat controlled to a setting environment based on a user attribute without requiring input of a user name, password and the like, user convenience will be substantially improved.

According to an embodiment of the present disclosure, there is provided a novel and improved input apparatus, output apparatus, and storage medium that are capable of performing an input/output setting based on an automatically-estimated user attribute.

According to an embodiment of the present disclosure, there is provided an input apparatus including an estimation unit configured to automatically estimate an attribute of a user, a setting unit configured to set an input mode based on the attribute of the user estimated by the estimation unit, and a control unit configured to control input based on the set input mode.

According to an embodiment of the present disclosure, there is provided an output apparatus including an estimation unit configured to automatically estimate an attribute of a user, a setting unit configured to set an output mode based on the attribute of the user estimated by the estimation unit, and a control unit configured to control output based on the set output mode.

According to an embodiment of the present disclosure, there is provided a non-transitory computer-readable storage medium having a program stored therein, the program causing a computer to function as an estimation unit configured to automatically estimate an attribute of a user, a setting unit configured to set an input mode based on the attribute of the user estimated by the estimation unit, and a control unit configured to control input based on the set input mode.

According to an embodiment of the present disclosure, there is provided a non-transitory computer-readable storage medium having a program stored therein, the program causing a computer to function as an estimation unit configured to automatically estimate an attribute of a user, a setting unit configured to set an output mode based on the attribute of the user estimated by the estimation unit, and a control unit configured to control output based on the set output mode.

According to one or more of embodiments of the present disclosure, input/output settings can be made based on an automatically-estimated user attribute.

BRIEF DESCRIPTION OF THE DRAWINGS

FIG. 1 is a diagram illustrating an outline of input/output setting according to an embodiment of the present disclosure;

DETAILED DESCRIPTION OF THE EMBODIMENT(S)

Figure 2:
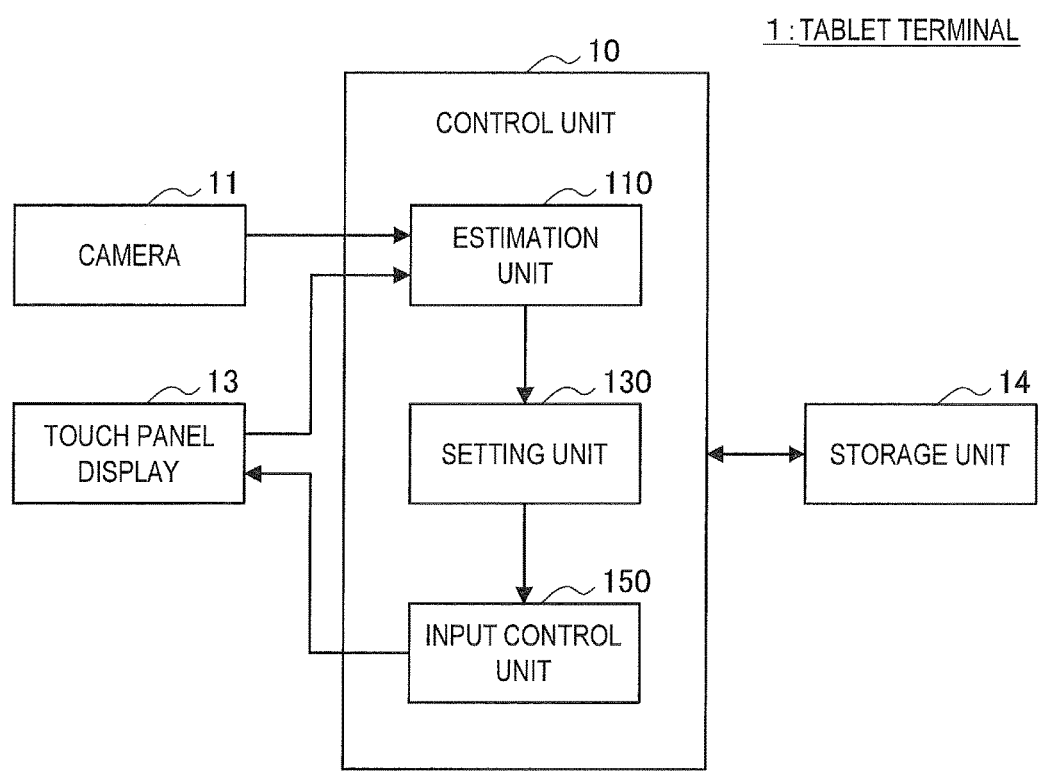
FIG. 2 is a block diagram illustrating a configuration of a tablet terminal according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be made in the following order.
1. Outline of input/output setting according to an embodiment of the present disclosure
2. Embodiments of the present disclosure
2-1. First embodiment of the present disclosure
2-2. Second embodiment of the present disclosure
3. Summary

1. Outline of Input/Output Setting According to an Embodiment of the Present Disclosure First, an outline of input/output setting according to an embodiment of the present disclosure will be described with reference to FIG. 1.

FIG. 1 is a diagram illustrating an outline of input/output setting according to an embodiment of the present disclosure. As illustrated in FIG. 1, a tablet terminal 1 according to the present embodiment automatically estimates a user attribute, and sets an input mode or an output mode based on the estimated user attribute. For example, the tablet terminal 1 estimates as a user attribute of a user U1 that the user is an adult, and estimates as a user attribute of a user U2 that the user is a child. It is noted that the method for estimating a user attribute will be described in more detail in the respective embodiments of the present disclosure.

Further, if the user attribute is "adult", the tablet terminal 1 sets to an input mode or output mode that is easy to use for an adult, and if the user attribute is "child", the tablet terminal 1 sets to an input mode or output mode that is easy to use for a child.

Specifically, if the input mode setting has been performed based on "user attribute: adult", as illustrated in FIG. 1, when displaying a software keyboard on a touch panel display 13, for example, the tablet terminal 1 displays a software keyboard P1 with an alphabet layout.

On the other hand, if the input mode setting has been performed based on "user attribute: child", as illustrated in FIG. 1, when displaying a software keyboard on the touch panel display 13, for example, the tablet terminal 1 displays a software keyboard P2 with a kana (Japanese script) layout.

Thus, according to an embodiment of the present disclosure, user convenience can be improved by automatically estimating a user attribute, and setting the input mode or output mode based on the estimated user attribute.

Further, since there is no need for user pre-registration, and a somewhat comfortable environment is set based on a user attribute without having to input a user name and password, user convenience is further improved.

In the above an outline of input/output setting according to an embodiment of the present disclosure was described. Next, the input/output setting according to the present embodiment will be described in more detail with reference to a plurality of embodiments of the present disclosure. It is noted that in the below-described embodiments of the present disclosure, the tablet terminal 1 is used as an example of an input apparatus. However, the input apparatus according to the embodiments of the present disclosure is not limited to the tablet terminal 1. For example, the input apparatus according to the embodiments of the present disclosure may be a smartphone, a mobile telephone terminal, a PDA (personal digital assistant), a PC (personal computer), a digital camera, a video camcorder, a microphone, a remote controller and the like.

Further, in the respective embodiments of the present disclosure described below, although a PC 2 and an audio apparatus 3 are used as the output apparatus setting the output mode, the output apparatus according to the embodiments of the present disclosure is not limited to the PC 2 and the audio apparatus 3. For example, the output apparatus according to the embodiments of the present disclosure may be a smartphone, a mobile telephone terminal, a PDA, a PC, a digital camera, a video camcorder, a projector, a television apparatus and the like.

In addition, an input/output apparatus capable of executing both the setting of the input mode and setting of the output mode according to the embodiments of the present disclosure is also obviously included in the scope of the present disclosure. Specific examples of an input/output apparatus include a smartphone, a mobile telephone terminal, a PDA, a PC, a digital camera, a video camcorder and the like.

2. Embodiments of the Present Disclosure

2-1. First Embodiment of the Present Disclosure

First, setting of the input mode based on a user attribute according to an embodiment of the present disclosure will be described with reference to a first embodiment of the present disclosure. In the present embodiment, the tablet terminal 1 illustrated in FIG. 1 is used as an example of the input apparatus for setting the input mode based on a user attribute. In the following, the configuration and operation processing of the tablet terminal 1 according to the present embodiment will be described in order with reference to FIGS. 2 and 3.

2-1-1. Configuration

FIG. 2 is a block diagram illustrating a configuration of the tablet terminal 1 according to the first embodiment of the present disclosure. As illustrated in FIG. 2, the tablet terminal 1 according to the present embodiment has a control unit 10, a camera 11, a touch panel display 13, and a storage unit 14.

Control Unit

The control unit 10 controls the whole tablet terminal 1 by issuing commands to the respective parts in the tablet terminal 1. Specifically, as illustrated in FIG. 2, the control unit 10 functions as an estimation unit 110, a setting unit 130, and an input control unit 150.

The estimation unit 110 has a function of estimating a user attribute. In the present specification, examples of the user attribute may include the level of familiarity the user has with the tablet terminal 1, the user's age, age range, whether the user is a child, an adult, or an elderly person, the user's race, nationality, eyesight or the like.

Such a user attribute can be estimated by the estimation unit 110 based on, for example, the state or content of an input by the user that is detected by the touch panel display 13, or on a captured image of the user detected by the camera 11.

Specifically, the estimation unit 110 can estimate the level of familiarity the user has with the tablet terminal 1 based on an input state detected by the touch panel display 13 (specifically, based on the input speed, accuracy etc.). For example, the faster the input speed, or the more accurate the input content (the lower the degree of mistaken inputs), the higher the level of familiarity estimated by the estimation unit 110. Further, the slower the input speed, or the less accurate the input content (the greater the degree of mistaken inputs), the lower the level of familiarity estimated by the estimation unit 110. In addition, the estimation unit 110 may also estimate the level of familiarity the user has with the tablet terminal 1 based on the user's age, age range, whether the user is a child, an adult, or an elderly person and the like detected based on a captured image that includes the user's face. For example, the estimation unit 110 may estimate a lower level of familiarity if the user is a child or an elderly person, and a higher level of familiarity if the user is an adult.

Further, the estimation unit 110 can estimate the user's age, age range, or whether the user is a child, an adult, or an elderly person based on the content input by the user (diction, word difficulty, usage frequency of (Chinese characters) etc.) detected by the touch panel display 13, or based on the user's name (especially, first name). Namely, since diction, the difficulty of words used, usage frequency of kanji and the like differ depending on the user's age, age range, or whether the user is a child, an adult, or an elderly person, the estimation unit 110 can estimate the age of the user, for example, based on such information. In addition, similarly, since the user's name (especially, his/her first name) and name pattern differ depending on the user's age, age range, or whether the user is a child, an adult, or an elderly person, the estimation unit 110 can estimate the age of the user, for example, based on such information. It is noted that statistical data pre-stored in the storage unit 14 about age and the diction and names of each age range may be used when performing estimation. Moreover, the estimation unit 110 can also estimate the user's age, age range, or whether the user is a child, an adult, or an elderly person and the like based on a facial image of the user taken by the camera 11.

Still further, the estimation unit 110 can estimate the user's race or nationality based on the input content detected by the touch panel display 13 or based on the user's name. Specifically, the estimation unit 110 estimates the user's race or nationality based on the type of words that were input, and on characteristics about the user's name. In addition, the estimation unit 110 can also estimate the user's race or nationality based on a facial image of the user taken by the camera 11.

Further, the estimation unit 110 can estimate the user's eyesight based on an image of the eyes included in a facial image of the user taken by the camera 11. In addition, the estimation unit 110 can also estimate the user's eyesight based on the distance between the user's face measure by a distance sensor (not illustrated) and the touch panel display 13.

The above-described estimation of a user attribute by the estimation unit 110 is performed using estimation data stored in advance in the storage unit 14. Further, if the tablet terminal 1 has a communication function and can connect to an external network, the estimation of a user attribute by the estimation unit 110 according to the present embodiment can also be performed using estimation data acquired from a predetermined server on the network.

The setting unit 130 has a function of setting the input mode based on a user attribute estimated by the estimation unit 110. Setting of the input mode sets various settings relating to the input of information into the tablet terminal 1. Specifically, based on a user attribute, the setting unit 130 can set the layout and function of an input screen, the key layout on a software keyboard included in the input screen and the like.

For example, if the level of familiarity indicated by the user attribute is lower than a predetermined threshold, the setting unit 130 sets an input screen for beginners, and if the level of familiarity is higher than the predetermined threshold, the setting unit 130 sets an input screen for advanced users.

Further, if the age or age range indicated by the user attribute is lower than a first predetermined age, or higher than a second predetermined range, or if the user attribute indicates a child or an elderly person, the setting unit 130 sets a software keyboard P2 with a kana layout like that illustrated in FIG. 1. On the other hand, if the age or age range indicated by the user attribute is higher than the first predetermined age and lower than the second predetermined range, or if the user attribute indicates an adult, the setting unit 130 sets a software keyboard P1 with an alphabet layout like that illustrated in FIG. 1. Still further, if the user attribute indicates an adult or a level of familiarity equal to or greater than a predetermined value (an advanced user), in addition to the alphabet layout, the setting unit 130 can also set T9 input. T9 input is a character input method that enables words and phrases to be input that were converted based on a prediction using vowels selected by tapping vowels keys consecutively on a keyboard on which vowel keys are arranged.

Still further, based on the race or nationality indicated by the user attribute, the setting unit 130 can set an input screen and software keyboard that allow a language matching that race or nationality to be input.

Moreover, based on the eyesight indicated by the user attribute, the setting unit 130 can set a size for the characters and input columns included in the input screen and a size for the keys on the software keyboard.

In addition, if the tablet terminal 1 is a terminal into which gestures can be input, the setting unit 130 can set gesture recognition based on a user attribute (age, age range, whether a child, an adult, or an elderly person, race, nationality etc.). Namely, since the meaning of a gesture or the gestures themselves can be different depending on generation or country, by setting gesture recognition that is based on a user attribute, the user can perform a gesture input without feeling a sense of strangeness. Further, if the user is a child, since the gesture movements can be expected to be larger than normal, the setting unit 130 can also set gesture recognition that is capable of handling gestures in which the movement is large if the user attribute indicates a child.

Thus, based on a user attribute, the setting unit 130 can set an input mode that is easy for the user with that attribute to use.

The input control unit 150 has a function of controlling input based on the input mode set by the setting unit 130. For example, the input control unit 150 controls the touch panel display 13 so that the input screen and software keyboard set by the setting unit 130 are displayed.

Camera

The camera 11 includes, for example, a lens system configured from an imaging lens, a diaphragm, a zoom lens, and a focus lens, a drive system that makes the lens system perform a focus operation and a zoom operation, and a solid-state image sensor array that generates an imaging signal by photoelectrically converting captured light obtained by the lens system. The solid-state image sensor array may be realized by, for example, a CCD (chargecoupled device) sensor array or a CMOS (complementary metal oxide semiconductor) sensor array.

The camera 11 according to the present embodiment is arranged facing the user side so that the face of the user utilizing the tablet terminal 1 can be included in the angle of view. Further, the camera 11 outputs the captured image to the control unit 10.

Touch Panel Display

The touch panel display 13 is an example of an input/output device in which the operation input function and the display function have been integrated. The touch panel display 13 displays a predetermined screen on the display based on an instruction from the input control unit 150 in the control unit 10. Further, the touch panel display 13 detects a touch operation made by the user on the screen, and outputs the detected touch operation to the control unit 10 as operation input data. It is noted that although a case is described here in which the operation input function and the display function are integrated, the operation input function and the display function may be separate. For example, these functions can be separately provided as an operation input unit and a display unit.

Storage Unit

The storage unit 14 stores various programs for the various functions executed by the control unit 10 and various data files. Specifically, for example, data for user attribute estimation, data for input mode setting and the like are stored in the storage unit 14.

In the above, the configuration of the tablet terminal 1 according to the first embodiment of the present disclosure was described in detail with reference to FIG. 2. It is noted that the configuration of the tablet terminal 1 according to the present embodiment is not limited to the example illustrated FIG. 2. For example, the tablet terminal 1 may be configured without the camera 11, and may be configured with a microphone and a speaker as an input/output device. Further, the tablet terminal 1 may have a communication unit for connecting with an external apparatus.

2-1-2. Operation Processing

Next, the operation processing of the tablet terminal 1 according to the first embodiment of the present disclosure will be described with reference to FIG. 3.

Figure 3:
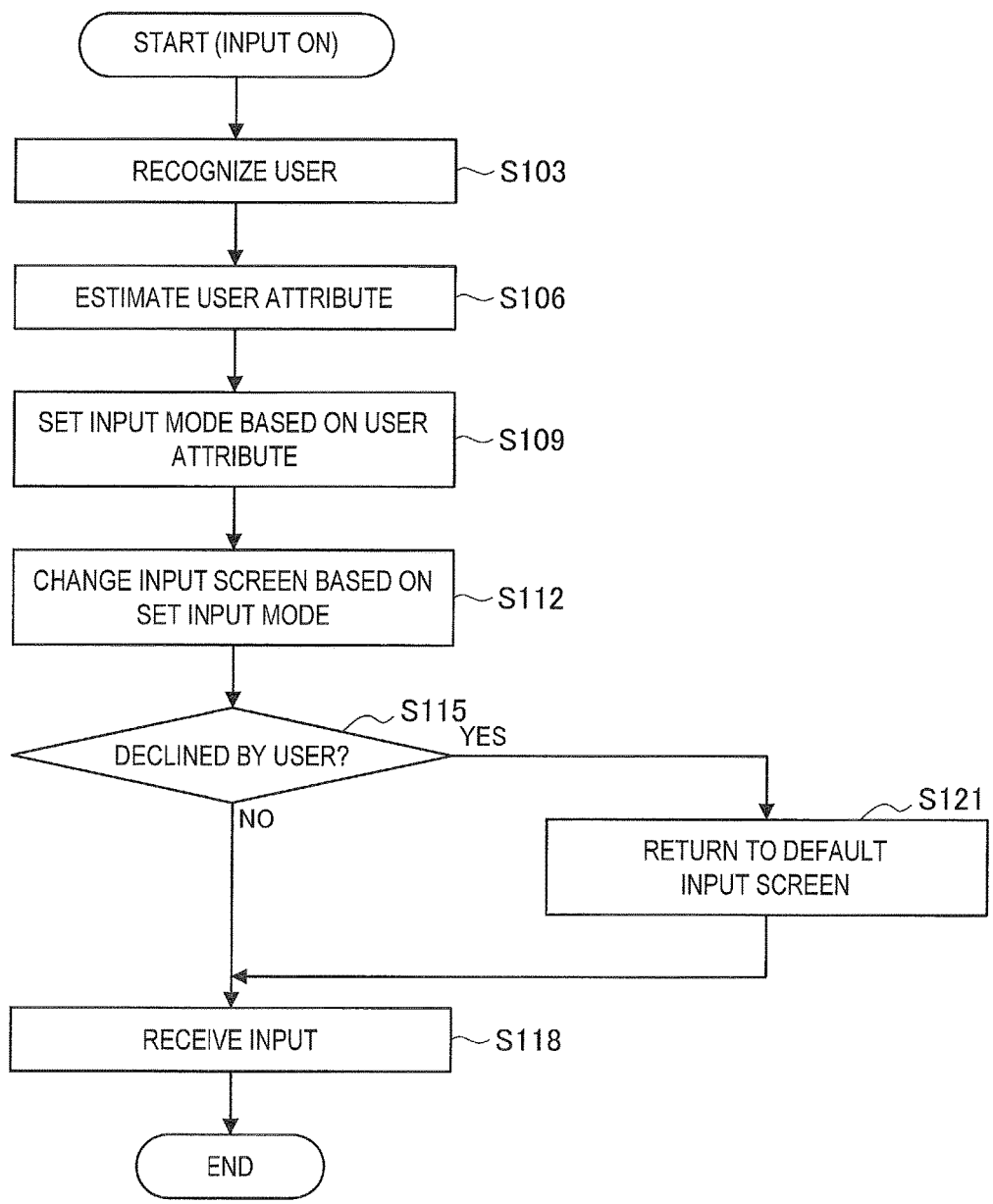
FIG. 3 is a flowchart illustrating an input setting process according to a first embodiment of the present disclosure.

FIG. 3 is a flowchart illustrating an input setting process according to the first embodiment of the present disclosure. As illustrated in FIG. 3, first, in step S103, the tablet terminal 1 recognizes the presence of the user utilizing the tablet terminal 1. For example, the tablet terminal 1 recognizes the presence of the user in cases such as when the power of the tablet terminal 1 has been switched on, when an operation input from the touch panel display 13 has started, or when the user's face is included in the field of view of the camera 11.

Next, in step S106, the estimation unit 110 in the tablet terminal 1 estimates a user attribute. As described above, the user attribute is automatically estimated based on the content or the state of an input from the touch panel display 13, or a facial image of the user taken by the camera 11.

Next, in step S109, the setting unit 130 sets the input mode based on the user attribute estimated by the estimation unit 110. For example, the setting unit 130 can set the input screen to a screen for beginners or a screen for advanced users based on the level of familiarity the user has with the tablet terminal 1 as indicated by the user attribute. Further, the setting unit 130 can set the key layout on a software keyboard included in the input screen based on the user's age, age range, whether the user is a child, an adult, or an elderly person and the like as indicated by the user attribute.

Next, in step S112, the input control unit 150 controls so that the input screen displayed on the touch panel display 13 changes according to the input mode set by the setting unit 130. This enables the tablet terminal 1 to set the input mode based on the estimated user attribute. Consequently, since the input mode is changed to a mode that is easy to use without the user having to input a password and a user ID, or perform user pre-registration, convenience is further improved.

Next, in step S115, the tablet terminal 1 determines whether the user declined the change in the input mode. This step is carried out because some users may not like the input mode that was changed based on the user attribute. The determination regarding whether the change was declined or not can be performed based on an operation input by the user that is detected from the touch panel display 13, for example.

Next, if it is determined that the user declined the change to the input mode (NO in S115), in step S121, the setting unit 130 changes the input mode setting to a default. Further, the input control unit 150 controls so that the default input screen is displayed on the touch panel display 13 based on the setting by the setting unit 130. Then, in step S118, the tablet terminal 1 receives operation inputs made by the user that are detected from the touch panel display 13 in the set input mode.

In the above, the operation processing according to the first embodiment of the present disclosure was described with reference to FIG. 3. According to the present embodiment, convenience is further improved because the input mode is set based on an automatically-estimated user attribute.

2-2. Second Embodiment of the Present Disclosure

Next, setting of the output mode based on a user attribute according to an embodiment of the present disclosure will be described with reference to a second embodiment of the present disclosure. Here, examples of the output mode may include a display output mode and an audio signal output mode. The following will be described using a PC (personal computer) as an example of the output apparatus that sets the display output mode, and an audio apparatus will be described as an example of the output apparatus that sets the audio signal output mode.

2-2-1. Setting of a Display Output Mode

First, setting of a display output mode will be described in detail with reference to FIGS. 4 to 7.

Outline

Figure 4:
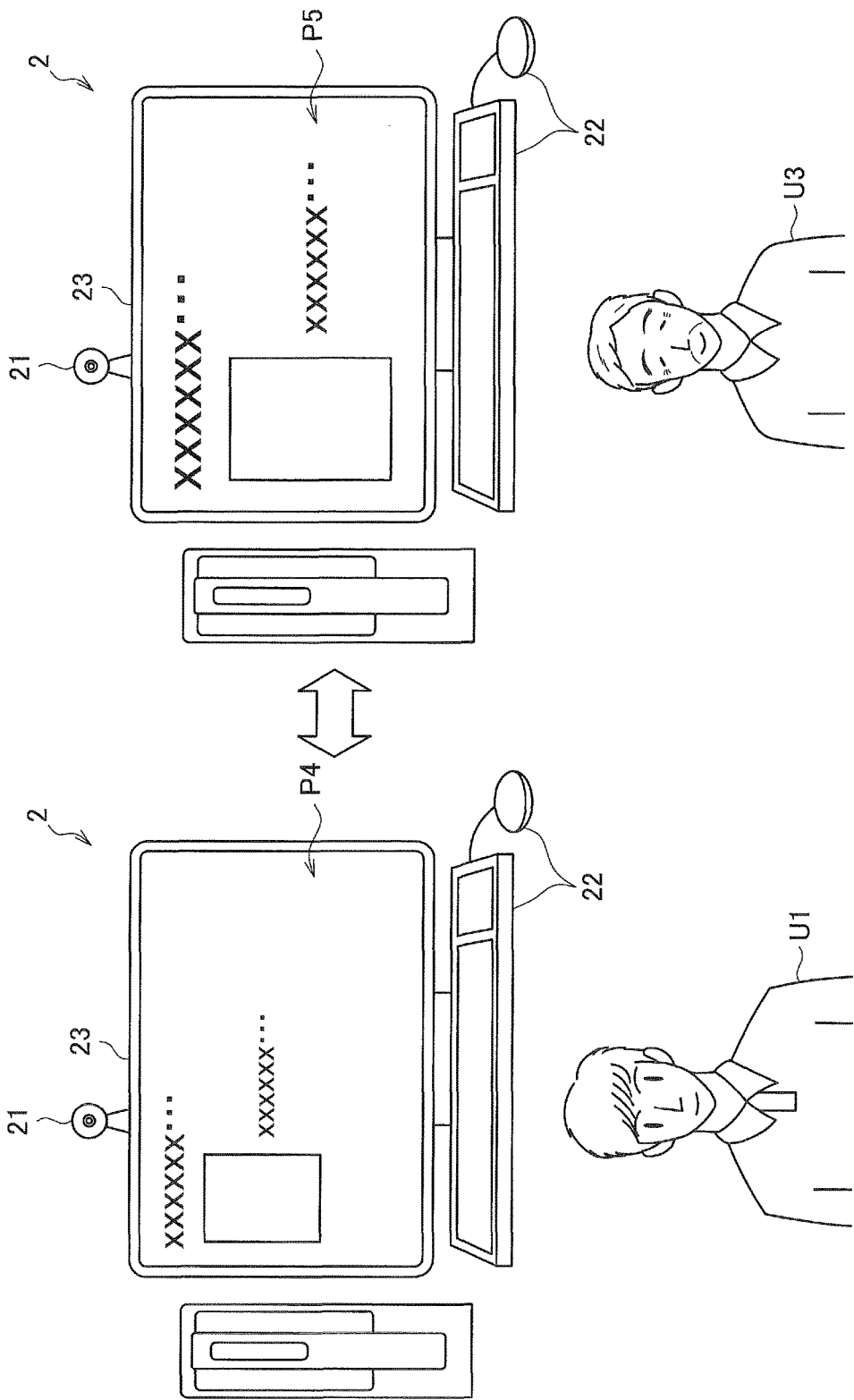
FIG. 4 is a diagram illustrating an outline of setting of a display output mode according to a second embodiment of the present disclosure.

FIG. 4 is a diagram illustrating an outline of the setting of the display output mode. As illustrated in FIG. 4, a PC 2, which is an example of the output apparatus that sets the display output mode, has a display apparatus 23 and an operation input unit 22. The PC 2 controls the display on the display apparatus 23 based on a user operation detected from the operation input unit 22. Further, as illustrated in FIG. 4, the PC 2 can also have a camera 21 that is arranged so as to include the face of the user of the PC 2 included in its field of view.

Here, the PC 2 automatically estimates a user attribute, and sets the display output mode based on the estimated user attribute. For example, the PC 2 estimates "adult" as a user attribute for a user U1, and "elderly person" as a user attribute for a user U3. The method for estimating the user attribute is the same as in the first embodiment of the present disclosure. Thus, for example, the estimation is made based on the content or state of an input from the operation input unit 22, or on a facial image of the user taken by the camera 21.

Further, if the user attribute is "adult", the PC 2 sets to a display output mode that is easy to see for adults, while if the user attribute is "elderly person", the PC 2 sets to a display output mode that is easy to see for elderly people.

Specifically, the PC 2 sets so that the size and the font of the characters on the display screen of the display apparatus 23 are a size and font that can be easily seen by an "adult" or an "elderly person" and that places little strain on the eyes. In the example illustrated in FIG. 4, when the display output mode setting is performed based on "user attribute: adult", the display screen P4 is displayed, and when the display output mode setting is performed based on "user attribute: elderly person", the display screen P5, which expresses characters in a larger size than the display screen P4, is displayed.

Thus, according to an embodiment of the present disclosure, user convenience can be improved by automatically estimating a user attribute, and setting the display output mode based on the estimated user attribute. In the following, the internal configuration and operation processing of the PC 2 according to the present embodiment will be described with reference to FIGS. 5 to 7.

Internal Configuration

Figure 5:
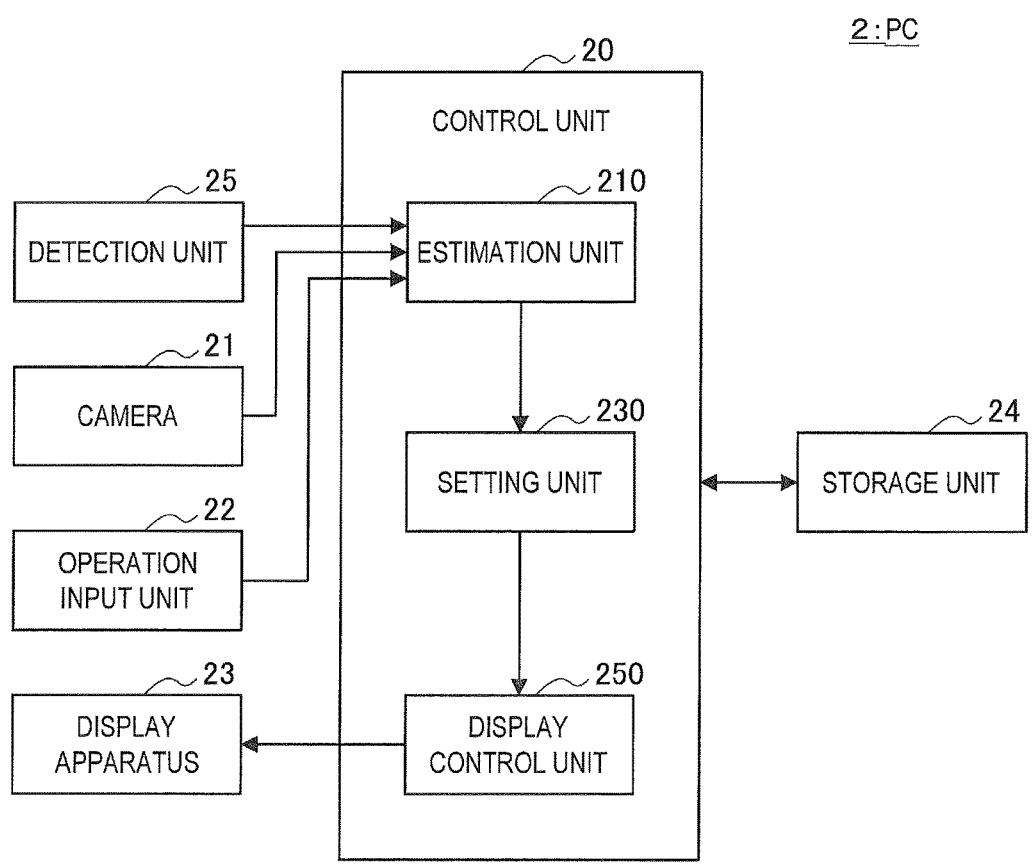
FIG. 5 is a block diagram illustrating an internal configuration of a PC according to a second embodiment of the present disclosure.

FIG. 5 is a block diagram illustrating an internal configuration of the PC 2 according to the second embodiment of the present disclosure. As illustrated in FIG. 5, the PC 2 has a control unit 20, a camera 21, an operation input unit 22, a display apparatus 23, a storage unit 24, and a detection unit 25.

The control unit 20 controls the whole PC 2 by issuing commands to the respective parts in the PC 2. Specifically, as illustrated in FIG. 5, the control unit 20 functions as an estimation unit 210, a setting unit 230, and a display control unit 250.

The estimation unit 210 has a function of estimating a user attribute. The specific estimation method is the same as the estimation method by the estimation unit 110 according to the first embodiment of the present disclosure described with reference to FIG. 2. Further, the estimation unit 210 according to the present embodiment can also estimate a user attribute based on a detection result from the detection unit 25. The detection unit 25, which is provided on a power switch for the PC 2, for example, can detect a user's fingerprint, finger size, perspiration amount, or pressing force when the user performs an operation to turn on the power by touching the power switch. The estimation unit 210 can estimate a user attribute, such as the user's age, age range, or whether the user is a child, an adult, or an elderly person, based on the detection result from the detection unit 25.

Further, the estimation unit 210 can also estimate a user attribute by verifying a fingerprint detected by the detection unit 25 with a user fingerprint registered in advance. Since this enables the user to unconsciously log in based on a natural operation of turning on the power to the PC without having to consciously input a user ID and password (perform a log-in operation), convenience is further improved.

The setting unit 230 has a function of setting the display output mode based on the user attribute estimated by the estimation unit 210. Setting of the display output mode sets various settings relating to display control of the PC 2. The setting unit 230 can set a notation (how items are displayed on the display screen; hereinafter referred to simply as "notation"), such as the size and font of the characters on the display screen, language, the presence of furigana (a phonetic Japanese script printed alongside characters) and the like based on a user attribute.

Specifically, if the user is a child, the setting unit 230 sets so that the character size is larger than normal, furigana are printed alongside kanji, kanji are converted into kana (Japanese script), and the image size is larger than normal. Further, if the user is an elderly person, the setting unit 230 sets so that the character size and image size are larger than normal. Still further, the setting unit 230 can also set so as to display based on the user's race or nationality. Moreover, the setting unit 230 can set the display screen to a screen for beginners or a screen for advanced users based on the user's level of familiarity.

The display control unit 250 has a function of controlling the display based on the display output mode set by the setting unit 230. For example, the display control unit 250 controls the display apparatus 23 so that the display screen set by the setting unit 230 is displayed.

Since the camera 21 is the same as the camera 11 according to the first embodiment of the present disclosure, a description thereof will be omitted here.

The operation input unit 22 has a function of detecting an operation input made by the user. As illustrated in FIG. 4, the operation input unit 22 is realized by a keyboard and a mouse, for example. Further, the operation input unit 22 according to the present embodiment outputs the data of the detected operation input to at least the estimation unit 210 in the control unit 20.

The display apparatus 23 is a device that has a screen display function. The display apparatus 23 is realized by an organic EL (electroluminescence) display, or a LED (light-emitting diode) display. Further, the display apparatus 23 according to the present embodiment performs a screen display under the control of the display control unit 250.

The storage unit 24 stores various programs for the various functions executed by the control unit 20 and various data files. Specifically, for example, the storage unit 24 stores data for user attribute estimation and data for display output mode setting.

The detection unit 25 is a sensor that is capable of detecting information to be used for user attribute estimation, such as the user's fingerprint or finger size. The detection unit 25, which is provided on the power switch for the PC 2, for example, can detect a user's fingerprint, finger size, perspiration amount, and the pressing force when the user performs an operation to turn on the power by touching the power switch. Further, the detection unit 25 outputs the detection result to the estimation unit 210 in the control unit 20.

In the above, the configuration of the PC 2 according to the second embodiment of the present disclosure was described in detail with reference to FIG. 5. It is noted that the configuration of the PC 2 according to the present embodiment is not limited to the example illustrated in FIG. 5. For example, the PC 2 may be configured without having the camera 21 and the detection unit 25. Further, the PC 2 may also be configured having a communication unit for connecting to an external apparatus.

Next, the operation processing of the PC 2 according to the second embodiment of the present disclosure will be described with reference to FIGS. 6 and 7.

Operation Processing

Figure 6:
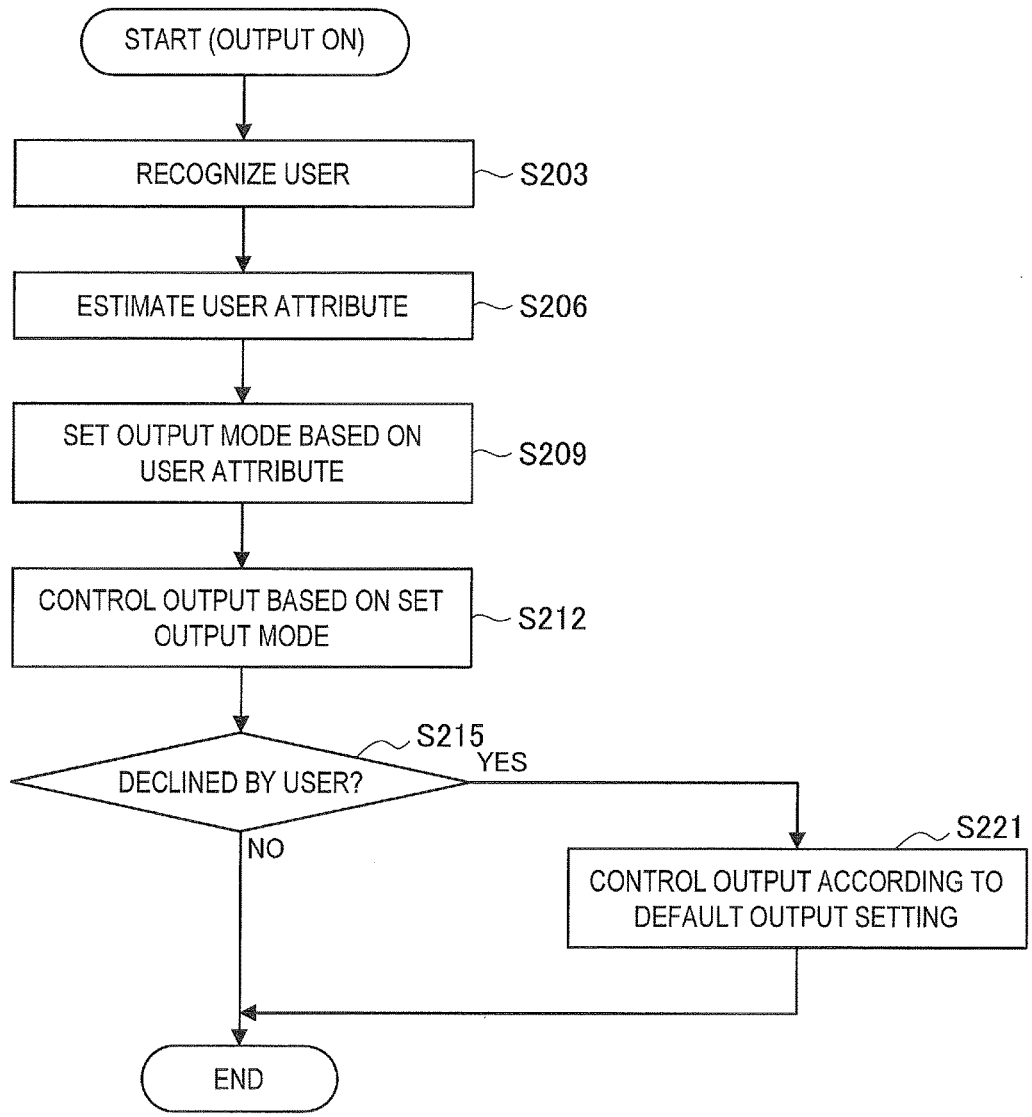
FIG. 6 is a flowchart illustrating operation processing of a basic output setting according to a second embodiment of the present disclosure.

FIG. 6 is a flowchart illustrating operation processing of a basic output setting according to the second embodiment of the present disclosure. First, the operation processing of the basic output setting according to the second embodiment of the present disclosure will be described with reference to FIG. 6. Namely, although the operation processing illustrated in FIG. 6 will be described as an example of the operation processing performed by the PC 2, the operation processing illustrated in FIG. 6 is operation processing of a basic output setting that includes the below-described operation processing of an audio signal output setting performed by the audio apparatus 3.

As illustrated in FIG. 6, first, in step S203, the PC 2 recognizes the presence of the user utilizing the PC 2. For example, the PC 2 recognizes the presence of the user in cases such as when the power of the PC 2 has been switched ON, when an operation input from the operation input unit 22 has started, or when the user's face is included in the field of view of the camera 21.

Next, in step S206, the estimation unit 210 in the PC 2 estimates a user attribute. As described above, the user attribute is automatically estimated based on the content or the state of an input from the operation input unit 22, a facial image of the user taken by the camera 21, or a fingerprint or finger size of the user detected by the detection unit 25.

Next, in step S209, the setting unit 230 sets the output mode based on the user attribute estimated by the estimation unit 210. The specific method for setting the output mode by the setting unit 230 will be described below with reference to the flowchart illustrated in FIG. 6.

Next, in step S212, the display control unit 250 performs output control based on the output mode detected by the setting unit 230. This enables the PC 2 to set the output mode based on the estimated user attribute. Consequently, since the output mode is changed to an automatically-estimated output mode suited to the user without the user having to input a password and a user ID, or perform user pre-registration, convenience is further improved.

Next, in step S215, the PC 2 determines whether the user declined the output mode setting based on the user attribute. This step is carried out because some users may not like the output mode that was set based on the user attribute. The determination regarding whether the setting was declined or not can be performed based on an operation input by the user that is detected from the operation input unit 22, for example.

Next, if it is determined that the user declined the output mode setting (NO in S215), in step S221, the setting unit 230 changes the output mode setting to a default. Further, the display control unit 250 performs output control according to the default output setting based on the setting by the setting unit 230.

In the above, the operation processing of a basic output setting according to the second embodiment of the present disclosure was described. Next, setting of a specific display output mode based on a user attribute will be described with reference to FIG. 7.

Figure 7:
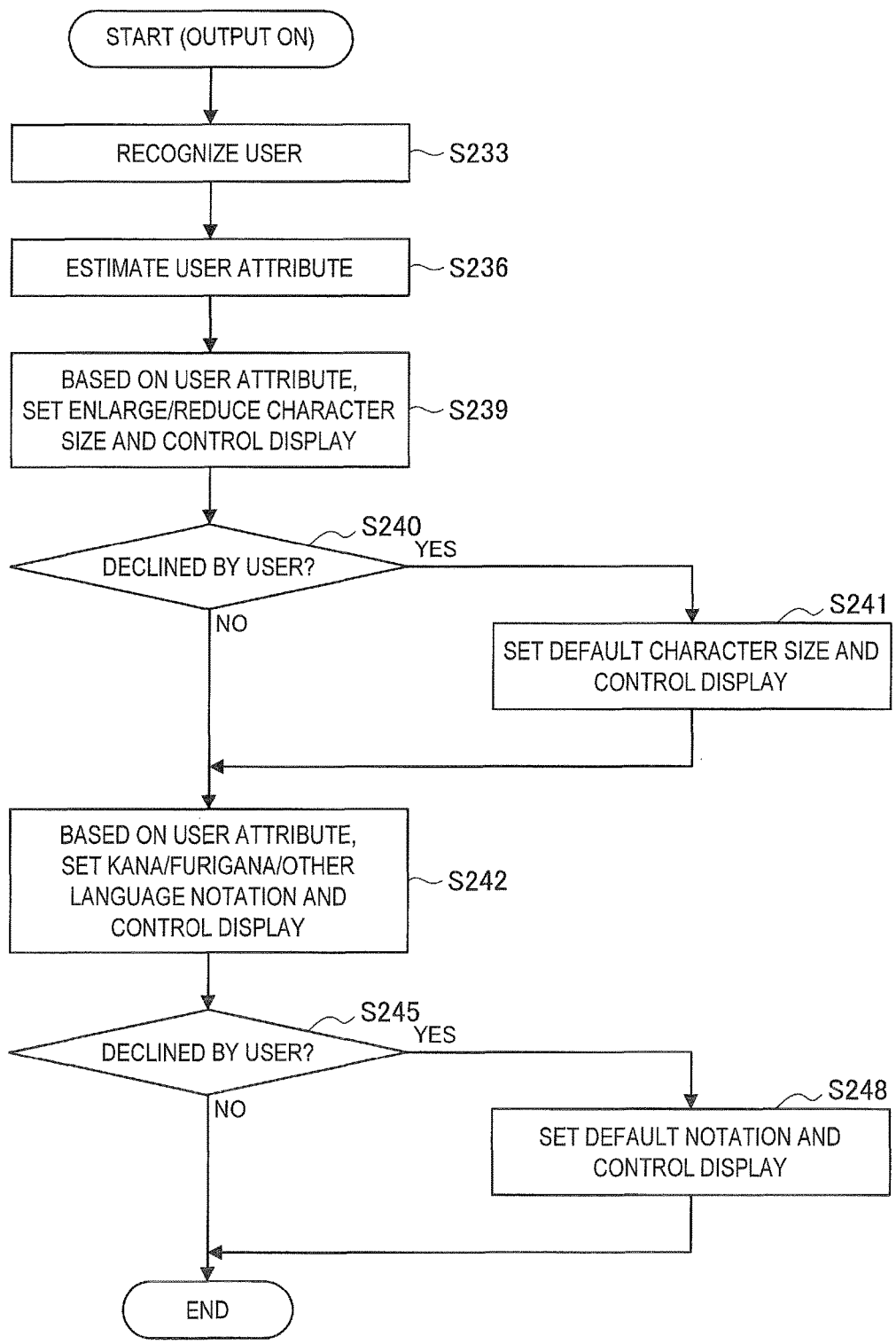
FIG. 7 is a flowchart illustrating an example of operation processing during setting of a display output mode by a PC according to a second embodiment of the present disclosure.

FIG. 7 is a flowchart illustrating an example of operation processing during setting of a display output mode by the PC 2 according to the second embodiment of the present disclosure. Since the processing performed in steps S233 and S236 is the same as the processing performed in steps S203 and S206 described with reference to FIG. 6, a description thereof will be omitted here.

In step S239, the control unit 20 in the PC 2 performs an enlarge/reduce character size setting with the setting unit 230 based on the user attribute estimated by the estimation unit 210, and controls the size of the characters displayed on the display apparatus 23 with the display control unit 250 based on this setting.

For example, if the user attribute indicates a child or an elderly person, or if the user eyesight indicated by the user attribute is less than a predetermined value, the setting unit 230 sets an enlarge character size setting. Further, if the user attribute indicates an adult, or if the user eyesight indicated by the user attribute is more than a predetermined value, the setting unit 230 sets a reduce character size setting. Thus, according to the present embodiment, by setting an appropriate character size based on an automatically-estimated user attribute, the characters on the screen are easier to view, so that eye strain can be further alleviated.

Next, in step S240, the PC 2 determines whether the character size setting based on a user attribute was declined by the user. This step is carried out because some users may not like the character size that was set based on the user attribute. The determination regarding whether the setting was declined or not can be performed based on an operation input by the user that is detected from the operation input unit 22, for example.

Next, if it is determined that the user declined the character size setting (NO in S240), in step S241, the setting unit 230 changes to a default character size. Further, the display control unit 250 controls so that the characters are displayed in the default character size based on the setting by the setting unit 230.

In addition, the PC 2 can change the setting of the text notation displayed on the display apparatus 23 based on a user attribute. Specifically, in step S242, the control unit 20 performs a notation setting, such as the presence of furigana, conversion from a kanji notation to a kana notation, conversion to another language and the like, with the setting unit 230 based on the user attribute estimated by the estimation unit 210. Then, the control unit 20 controls the text notation to be displayed on the display apparatus 23 with the display control unit 250 based on the setting by the setting unit 230.

For example, if the estimated user attribute indicates a child, the setting unit 230 performs a kana notation setting or a furigana notation setting. Further, the setting unit 230 sets so that the characters are written in a language based on the user race or nationality indicated by the estimated user attribute. Thus, according to the present embodiment, by setting an appropriate notation based on an automatically-estimated user attribute, convenience can be further improved.

Next, in step S245, the PC 2 determines whether the notation setting based on the user attribute was declined by the user. This step is carried out because some users may not like the notation that was set based on the user attribute. The determination regarding whether the setting was declined or not can be performed based on an operation input by the user that is detected from the operation input unit 22, for example.

Next, if it is determined that the user declined the notation setting (NO in S245), in step S248, the setting unit 230 changes to a default notation. Further, the display control unit 250 controls so that the characters are displayed in the default notation based on the setting by the setting unit 230.

2-2-2. Setting of an Audio Signal Output Mode

In the above, the display output setting according to the second embodiment of the present disclosure was described in detail. Next, setting of an audio signal output according to the present embodiment will be described in detail with reference to FIG. 9. Here, an audio apparatus 3 is described as an example of the output apparatus executing the audio signal output setting. The audio apparatus 3 according to the present embodiment can play music based on a user attribute from a speaker arranged indoors or outdoors.

Internal Configuration

Figure 8:
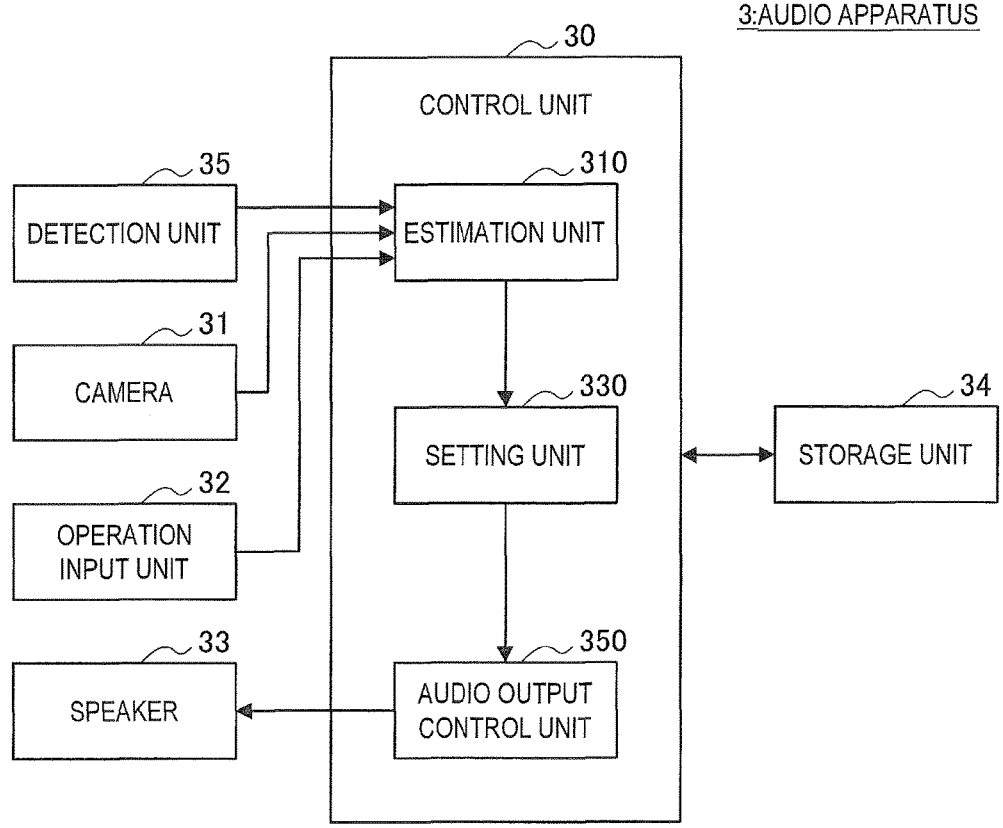
FIG. 8 is a block diagram illustrating an internal configuration of an audio apparatus according to a second embodiment of the present disclosure.

FIG. 8 is a block diagram illustrating an internal configuration of the audio apparatus 3 according to the second embodiment of the present disclosure. As illustrated in FIG. 8, the audio apparatus 3 has a control unit 30, a camera 31, an operation input unit 32, a speaker 33, a storage unit 34, and a detection unit 35.

The control unit 30 controls the whole audio apparatus 3 by issuing commands to the respective parts in the audio apparatus 3. Specifically, as illustrated in FIG. 8, the control unit 30 functions as an estimation unit 310, a setting unit 330, and an audio output control unit 350.

The estimation unit 310 has a function of estimating a user attribute. The estimation unit 310 can estimate a user attribute (the user's age, age range, whether the user is a child, an adult, or an elderly person, the user's race, nationality, sex or the like) based on a facial image of the user taken by the camera 31.

Further, the estimation unit 310 can also estimate a user attribute based on a detection result from the detection unit 35. The detection unit 35, which is provided on a power switch for the audio apparatus 3, for example, can detect a user's fingerprint or finger size when the user performs an operation to turn on the power by touching the power switch. The estimation unit 310 can estimate a user attribute, such as the user's age, age range, or whether the user is a child, an adult, or an elderly person, based on the detection result (user's fingerprint or finger size) from the detection unit 35. In addition, if the audio apparatus 3 is playing background music from a speaker located indoors, the detection unit 35 can detect the user's fingerprint or finger size when the user performs an operation to turn on the light by touching a light switch or when the user enters a room by opening a door.

It is noted that the estimation unit 310 can also estimate a user attribute by verifying a fingerprint detected by the detection unit 35 with a user fingerprint registered in advance. Since this enables the user to unconsciously log in based on a natural operation of turning on the power to the audio apparatus 3 without having to consciously input a user ID and password (perform a log-in operation), convenience is further improved.

In addition, the estimation unit 310 can also estimate a user attribute (e.g., the user's age, age range, whether the user is a child, an adult, or an elderly person etc.) based on the input content (selected song content etc.) and input state (operation accuracy etc.) from the operation input unit 32.

The setting unit 330 has a function of setting an audio output mode based on the user attribute estimated by the estimation unit 310. Setting of the audio output mode sets various settings relating to audio output control of the audio apparatus 3. Examples of such settings include sound quality, Codec, surround sound, effects/filter (deep bass emphasis, treble emphasis etc.) and the like.

Specifically, if the user is a child, the setting unit 330 selects music aimed at children, and sets a sound quality and effects/filter appropriate for a child. Meanwhile, similarly, if the user is an adult, an elderly person, a woman, a man etc., the setting unit 330 selects appropriate music aimed at those groups, and sets a sound quality and effects/filter so that listening is easy. Further, the setting unit 330 can also select music that is dear to the user's native country based on the race or nationality of the user.

The audio output control unit 350 has a function of controlling the audio output from the speaker 33 based on the audio output mode set by the setting unit 330.

The camera 31 is arranged in the audio apparatus 3, on the ceiling or a wall indoors, on an outdoor wall or the like so that the face of the user utilizing the audio apparatus 3 can be included in the field of view. The camera 31 outputs the captured facial image of the user to the estimation unit 310.

The operation input unit 32 has a function of detecting an operation input made by the user. The operation input unit 32 is realized by, for example, a power switch, a playback button, a stop button, a control button, a volume adjustment button and the like. Further, the operation input unit 32 according to the present embodiment outputs the data of the detected operation input to at least the estimation unit 310 in the control unit 30.

The speaker 33, which is an audio output unit that outputs an audio signal, may have an amplifier circuit. The speaker 33 according to the present embodiment plays back a predetermined audio signal under the control of the audio output control unit 350.

The storage unit 34 stores various programs for the various functions executed by the control unit 30 and various data files. Specifically, for example, the storage unit 34 stores data for user attribute estimation, data for audio output mode setting, various types of music data and the like.

The detection unit 35 is a sensor that is capable of detecting information to be used for user attribute estimation, such as the user's fingerprint or finger size. The detection unit 35, which as described above is provided on the power switch for the audio apparatus 3, an indoor light switch or a door knob, for example, can detect a user's fingerprint or finger size when the user performs a natural operation such as turning on the power. Further, the detection unit 35 outputs the detection result to the estimation unit 310 in the control unit 30.

In the above, the configuration of the audio apparatus 3 according to the second embodiment of the present disclosure was described in detail with reference to FIG. 8. It is noted that the configuration of the audio apparatus 3 according to the present embodiment is not limited to the example illustrated in FIG. 8. For example, the audio apparatus 3 may be configured without having the camera 31 and the detection unit 35. Further, the audio apparatus 3 may also be configured having a communication unit for connecting to an external apparatus.

Next, the operation processing of the audio apparatus 3 according to the second embodiment of the present disclosure will be described with reference to FIG. 9.

Operation Processing

Figure 9:
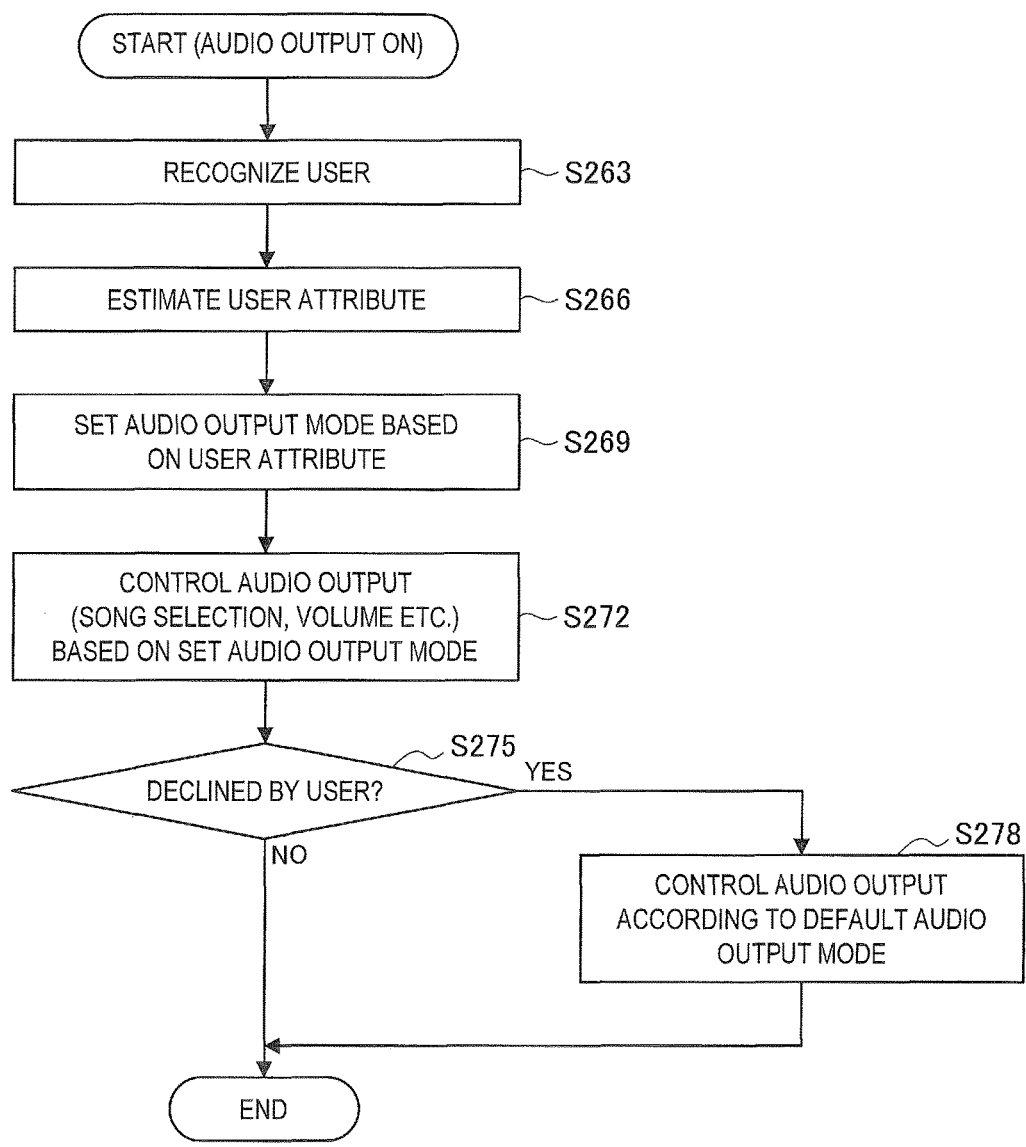
FIG. 9 is a flowchart illustrating an example of operation processing during setting of an audio output mode in an audio apparatus according to a second embodiment of the present disclosure.

FIG. 9 is a flowchart illustrating an example of operation processing during setting of an audio output mode of the audio apparatus 3 according to the second embodiment of the present disclosure. Since the processing performed in steps S263 and S266 is the same as the processing performed in steps S203 and S206 described with reference to FIG. 6, a description thereof will be omitted here.

Next, in step S269, the audio input unit 30 in the audio apparatus 3 sets the audio output mode with the setting unit 330 based on the user attribute estimated by the estimation unit 310.

Next, in step S272, the audio output control unit 350 performs audio output control based on the audio output mode set by the setting unit 330. This enables the audio apparatus 3 to set the audio output mode based on the estimated user attribute. Consequently, since the audio output mode is changed to an appropriate audio output mode that is based on an automatically-estimated user attribute, without the user having to input a password and a user ID, or perform user pre-registration, convenience is further improved.

Next, in step S275, the audio apparatus 3 determines whether the audio output mode setting based on the user attribute was declined by the user. This step is carried out because some users may not like the audio output mode that was set based on the user attribute. The determination regarding whether the setting was declined or not can be performed based on an operation input by the user that is detected from the operation input unit 32, for example.

Next, if it is determined that the user declined the audio output mode setting (NO in S275), in step S278, the setting unit 330 changes the audio output mode setting to a default. Further, the audio output control unit 350 performs audio output control according to the default audio output setting based on the setting by the setting unit 330.

In the above, the operation processing of the audio output setting of the audio apparatus 3 according to the second embodiment of the present disclosure was described in detail.

3. Summary

As described above, according to the embodiments of the present disclosure, user convenience can be improved by automatically estimating a user attribute, and setting the input mode or the output mode based on the estimated user attribute. It should be understood by those skilled in the art that various modifications, combinations, sub-combinations and alterations may occur depending on design requirements and other factors insofar as they are within the scope of the appended claims or the equivalents thereof.

For example, a computer program can be created for realizing the functions of the above-described tablet terminal 1, the PC 2, or the audio apparatus 3 on hardware, such as a CPU, a ROM, and a RAM, included in the tablet terminal 1, the PC 2, or the audio apparatus 3. Further, also provided is a computer-readable storage medium in which this program is stored.

Further, the method for estimating a user attribute by the estimation units 110, 210, and 310 according to the embodiments of the present disclosure is not limited to the above-described examples. For example, the estimation unit according to the embodiments of the present disclosure can estimate whether the user is a child or an adult based on the size of the user's hand. The size of the user's hand can be determined by a camera, a touch sensor provided on the keyboard and the like, for example.

Further, the estimation unit according to the embodiments of the present disclosure can also estimate the level of familiarity the user has with an apparatus, the user's age, age range, whether the user is a child, an adult, or an elderly person and the like based on the way the user places his/her hands on the keyboard or holds the mouse.

In addition, the estimation unit according to the embodiments of the present disclosure can also estimate whether the user is a child, an adult, or an elderly person, whether the user is a woman or a man and the like based on the way the pressure with which the user presses the keyboard or a switch. It is noted that the pressure with which the user presses the keyboard or a switch can be detected by the detection unit according to the embodiments of the present disclosure.

Still further, the estimation unit according to the embodiments of the present disclosure can also estimate a user attribute (age, age range, whether the user is a child, an adult, or an elderly person etc.) by, for example, recognizing the speaker based on the user's voice collected with a microphone.

Further, in addition to the above-described level of familiarity, age, age range and the like, a user attribute can also be an attribute of a family, a couple, one person, or a plurality of people, based on the number and sex of the users. This enables the setting unit according to the embodiments of the present disclosure to, for example, if the user attribute is "a plurality of people", perform a setting for outputting a competition game mode that is based on the number of people.

In addition, as the output mode setting, in addition to setting of the character size, font, and notation, the setting unit according to the embodiments of the present disclosure can also set so that information input by the user is output to a thread (electronic notice board) that is based on a user attribute.

For example, if the user attribute is "adult", the setting unit sets so that a passage input by the user is output to (posted on) a thread for adults. Further, if the user attribute is "child", the setting unit sets so that a passage input by the user is output to (posted on) a thread for children. Here, based on the assumption that the tablet terminal 1 is to be utilized in the home, the estimation unit can estimate that a female adult is a "mother", a male adult is a "father", and a child is a "child". In this case, the setting unit can set so that a passage input by the user is output to a thread having a predetermined attribute among the family threads (mother's electronic notice board, father's electronic notice board, children's electronic notice board) based on the estimated user attribute.

Further, the tablet terminal 1 (input apparatus) according to the first embodiment of the present disclosure can have the detection unit described in the second embodiment of the present disclosure. In this case, the estimation unit 110 according to the first embodiment of the present disclosure can estimate a user attribute based on a detection result from the detection unit. Specifically, the estimation unit 110 can estimate a user attribute, such as the user's age, age range, or whether the user is a child, an adult, or an elderly person, based on a detection result (fingerprint, finger size, perspiration amount, or pressing force) from the detection unit that is provided on a power switch of the tablet terminal 1.

Additionally, the present technology may also be configured as below.

(1)

An input apparatus including:
    an estimation unit configured to automatically estimate an attribute of a user;
    a setting unit configured to set an input mode based on the attribute of the user estimated by the estimation unit; and
    a control unit configured to control input based on the set input mode.

(2)

The input apparatus according to (1), wherein the attribute of the user estimated by the estimation unit indicates a level of familiarity the user has with the input apparatus.

(3)

The input apparatus according to (2), wherein the estimation unit is configured to estimate the level of familiarity of the user based on a state of an input by the user, age or age range of the user, or whether the user is a child, an adult, or an elderly person.

(4)

The input apparatus according to any one of (1) to (3), wherein the attribute of the user estimated by the estimation unit indicates age or age range of the user, or whether the user is a child, an adult, or an elderly person.

(5)

The input apparatus according to (4), wherein the estimation unit is configured to estimate the age or age range of the user, or whether the user is a child, an adult, or an elderly person based on content input by the user, a name of the user, or a captured image of a face of the user.

(6)

The input apparatus according to any one of (1) to (5), wherein the attribute of the user estimated by the estimation unit indicates race or nationality of the user.

(7) The input apparatus according to any one of (1) to (6), wherein the attribute of the user estimated by the estimation unit indicates eyesight of the user.

(8)

The input apparatus according to any one of (1) to (7), further including: a detection unit configured to detect information for estimating the attribute of the user, wherein the estimation unit is configured to estimate the attribute of the user based on a detection result from the detection unit.

(9)

The input apparatus according to any one of (1) to (8), wherein the input mode setting is a setting for an input screen or a setting for a key layout on a software keyboard that is included on the input screen.

(10)

The input apparatus according to any one of (1) to (8), wherein the input mode setting is a language setting during input.

(11)

An output apparatus including:
  an estimation unit configured to automatically estimate an attribute of a user;
  a setting unit configured to set an output mode based on the attribute of the user estimated by the estimation unit; and
  a control unit configured to control output based on the set output mode.

(12)

The output apparatus according to (11), wherein the attribute of the user estimated by the estimation unit indicates a level of familiarity the user has with the output apparatus.

(13)

The output apparatus according to (12), wherein the estimation unit is configured to estimate the level of familiarity of the user based on a state of an input by the use, age or age range of the user, or whether the user is a child, an adult, or an elderly person.

(14)

The output apparatus according to any one of (11) to (13), wherein the estimation unit is configured to estimate, as the user attribute, age or age range of the user, or whether the user is a child, an adult, or an elderly person based on content input by the user, a name of the user, or a captured image of a face of the user.

(15)

The output apparatus according to (11), further including:
  a detection unit configured to detect information for estimating the attribute of the user,
  wherein the estimation unit is configured to estimate the attribute of the user based on a detection result from the detection unit.

(16)

The output apparatus according to any one of (11) to (15), wherein the output mode setting is a setting of a size of characters included on a display screen or a font setting.

(17)

The output apparatus according to any one of (11) to (16), wherein the output mode setting is a setting of a notation on a display screen.

(18)

The output apparatus according to (17), wherein the notation setting is a setting about presence of furigana, conversion from kanji notation to kana notation, or conversion to another language.

(19)

A non-transitory computer-readable storage medium having a program stored therein, the program causing a computer to function as:
  an estimation unit configured to automatically estimate an attribute of a user;
  a setting unit configured to set an input mode based on the attribute of the user estimated by the estimation unit; and
  a control unit configured to control input based on the set input mode.

(20)

A non-transitory computer-readable storage medium having a program stored therein, the program causing a computer to function as:
  an estimation unit configured to automatically estimate an attribute of a user;
  a setting unit configured to set an output mode based on the attribute of the user estimated by the estimation unit; and
  a control unit configured to control output based on the set output mode.

What is claimed is:

1. A display control apparatus, comprising:
  circuitry configured to:
    obtain information, of an input speed of a gesture input of at least one user of a plurality of users, from a sensor that detects a hand of the at least one user;
    estimate an attribute of the at least one user based on the input speed; and
    control a display screen to display a layout image for the gesture input based on the estimated attribute of the at least one user.

2. The display control apparatus according to claim 1, wherein the circuitry is further configured to:
  estimate, based on the input speed, a level of familiarity that the at least one user has with the display control apparatus as the attribute of the at least one user; and
  change an image included in the layout image based on the level of familiarity.

3. The display control apparatus according to claim 1, wherein the estimated attribute of the at least one user indicates age or age range of the at least one user.

4. The display control apparatus according to claim 3, wherein the circuitry is configured to estimate the age or age range of the at least one user based on content of the gesture input, a name, or a facial image of the at least one user.

5. The display control apparatus according to claim 1, wherein the estimated attribute indicates race or nationality of the at least one user.

6. The display control apparatus according to claim 1, wherein the estimated attribute of the at least one user indicates eyesight.

7. The display control apparatus according to claim 1,
wherein the circuitry is configured to detect information for estimating the attribute of the at least one user,
wherein the circuitry is configured to estimate the attribute of the at least one user based on the detected information.

8. The display control apparatus according to claim 1, wherein the circuitry is configured to display a software keyboard in the layout image based on the input speed.

9. The display control apparatus according to claim 8, wherein the circuitry is configured to set a key layout on the displayed software keyboard based on the input speed.

10. The display control apparatus according to claim 9, wherein setting the software keyboard includes a language setting of the key layout of the software keyboard.

11. The display control apparatus according to claim 1, wherein the layout image is displayed on a display screen connected to the display control apparatus.

12. The display control apparatus according to claim 1, wherein the circuitry is further configured to:
obtain a first image of the at least one user, wherein the first image includes a facial image of the at least one user; and
estimate the attribute based on the input speed and the first image.

13. The display control apparatus according to claim 1, further comprising:
a camera configured to capture a first image of the at least one user,
wherein the circuitry is further configured to estimate the attribute based on the input speed and the first image.

14. The display control apparatus according to claim 13, wherein the circuitry is further configured to, based on the first image that includes the plurality of users, estimate the attribute of each of the plurality of users to set a competition game mode.

15. The display control apparatus according to claim 1, further comprising a terminal configured to receive the gesture input.

16. The display control apparatus according to claim 1, wherein the circuitry is configured to output a thread corresponding to the attribute to show information input by the at least one user.

17. A non-transitory computer-readable storage medium having stored thereon, computer-executable instructions for causing a computer to execute operations, the operations comprising:
obtaining information of an input speed of a gesture input of at least one user of a plurality of users from a sensor that detects a hand of the at least one user;
estimating an attribute of the at least one user based on the input speed; and
controlling a display screen to display a layout image for the gesture input based on the estimated attribute of the at least one user.

18. The non-transitory computer-readable storage medium according to claim 17,
wherein the estimated attribute indicates a level of familiarity that the at least one user has with the display control apparatus, and
wherein the operations further comprising changing an image included in the layout image based on the level of familiarity.

19. The non-transitory computer-readable storage medium according to claim 17, wherein the operations further comprising receiving an input to the layout image.

20. A display control method, comprising
obtaining information associated with an input speed of a gesture input of at least one user of a plurality of users from a sensor that detects a hand of at least one user;
estimating an attribute of the at least one user based on the input speed; and
controlling a display screen to display a layout image for the gesture input based on the estimated attribute of the at least one user.

* * * * *